United States Patent
Crandall et al.

(10) Patent No.: US 6,990,328 B2
(45) Date of Patent: Jan. 24, 2006

(54) WIRELESS PERIPHERAL DEVICE FOR ALLOWING AN IP SOFTPHONE TO PLACE CALLS TO A PUBLIC SAFETY ANSWERING POINT

(75) Inventors: Pamme Lynn Crandall, Louisville, CO (US); Christopher Jason Donley, Longmont, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 598 days.

(21) Appl. No.: 10/059,951

(22) Filed: Nov. 16, 2001

(65) Prior Publication Data

US 2003/0096589 A1    May 22, 2003

(51) Int. Cl.
*H04M 11/04* (2006.01)
(52) U.S. Cl. ............... 455/404.1; 455/404.2; 379/37; 379/45
(58) Field of Classification Search ............ 455/404.1, 455/404.2; 379/37, 45
See application file for complete search history.

(56) References Cited

U.S. PATENT DOCUMENTS

| | | | | |
|---|---|---|---|---|
| 5,479,482 A | * | 12/1995 | Grimes | ............ 455/556.1 |
| 6,154,658 A | * | 11/2000 | Caci | ............ 455/466 |
| 6,246,688 B1 | | 6/2001 | Angwin et al. | |
| 6,266,397 B1 | * | 7/2001 | Stoner | ............ 379/45 |
| 6,678,357 B2 | * | 1/2004 | Stumer et al. | ............ 379/45 |
| 6,807,564 B1 | * | 10/2004 | Zellner et al. | ............ 709/206 |
| 2002/0136364 A1 | * | 9/2002 | Stumer et al. | ............ 379/45 |
| 2003/0063714 A1 | * | 4/2003 | Stumer et al. | ............ 379/37 |

* cited by examiner

*Primary Examiner*—Jean Gelin
*Assistant Examiner*—Huy D. Nguyen
(74) *Attorney, Agent, or Firm*—John C. Moran

(57) ABSTRACT

Upon detecting the origination of an emergency call to a public safety answering point (PSAP), an IP softphone places this call over a cellular network rather than utilizing data communication. By placing the emergency call over the cellular system, the call is automatically routed by the cellular system to the appropriate PSAP, and the cellular system also provides to the PSAP the location of the IP softphone. The IP softphone utilizes a peripheral that provides the radio frequency circuitry necessary to place the emergency call to the PSAP.

16 Claims, 3 Drawing Sheets

WIRELESS PERIPHERAL DEVICE FOR ALLOWING AN IP SOFTPHONE TO PLACE CALLS TO A PUBLIC SAFETY ANSWERING POINT

TECHNICAL FIELD

This invention relates to telephones in general, and in particular, to the capability of placing telephone calls to the correct public safety answering points for emergency needs.

BACKGROUND OF THE INVENTION

In the office environment, IP softphones are interconnected via data connections to a customer communication switching system. A particular IP softphone may not be located in the same geographical area as the customer business communication switching system with which it is operating. Indeed, a particular IP softphone may not even be in the same state as the communication switching system. Even if the IP softphone is in the same building as the communication switching system, the communication switching system has no automatic means for determining the physical position of the IP softphone within the building. Such position information would have to be manually entered into the communication switching system. In addition, this manual information would have to be updated as the IP softphone moves throughout the building. For example, if a business traveler is in New Jersey but is utilizing a communication switching system in Colorado, upon placing a 911 emergency call, this call will be routed to a public safety answering point (PSAP) in Colorado. Since the communication switching system has no capability to route the call to a PSAP in New Jersey or to determine the location of IP softphone, the business traveler can only hang up their IP softphone and find a traditional telephone to place the 911 emergency call. Even if the business traveler is physically located in the same building as the communication switching system in Colorado, the dispatcher at the PSAP may not be able to assist the business traveler in response to a 911 emergency call since the dispatcher has no idea where in the office building the business traveler is.

SUMMARY OF THE INVENTION

This invention is directed to solving these and other problems and disadvantages of the prior art. According to an embodiment of the invention, upon detecting the origination of an emergency call to a public safety answering point (PSAP), the IP softphone will place this call over the cellular network rather than utilizing data communication. By placing the emergency call over the cellular system, the call is automatically routed by the cellular system to the appropriate PSAP, and the cellular system also provides to the PSAP the location of the IP softphone. Advantageously, the IP softphone utilizes a peripheral that provides the radio frequency circuitry necessary to place the emergency call to the PSAP.

These and other advantages and features of the present invention will become apparent from the following description of an illustrative embodiment of the invention taken together with the drawing.

DETAILED DESCRIPTION

Figure 1:
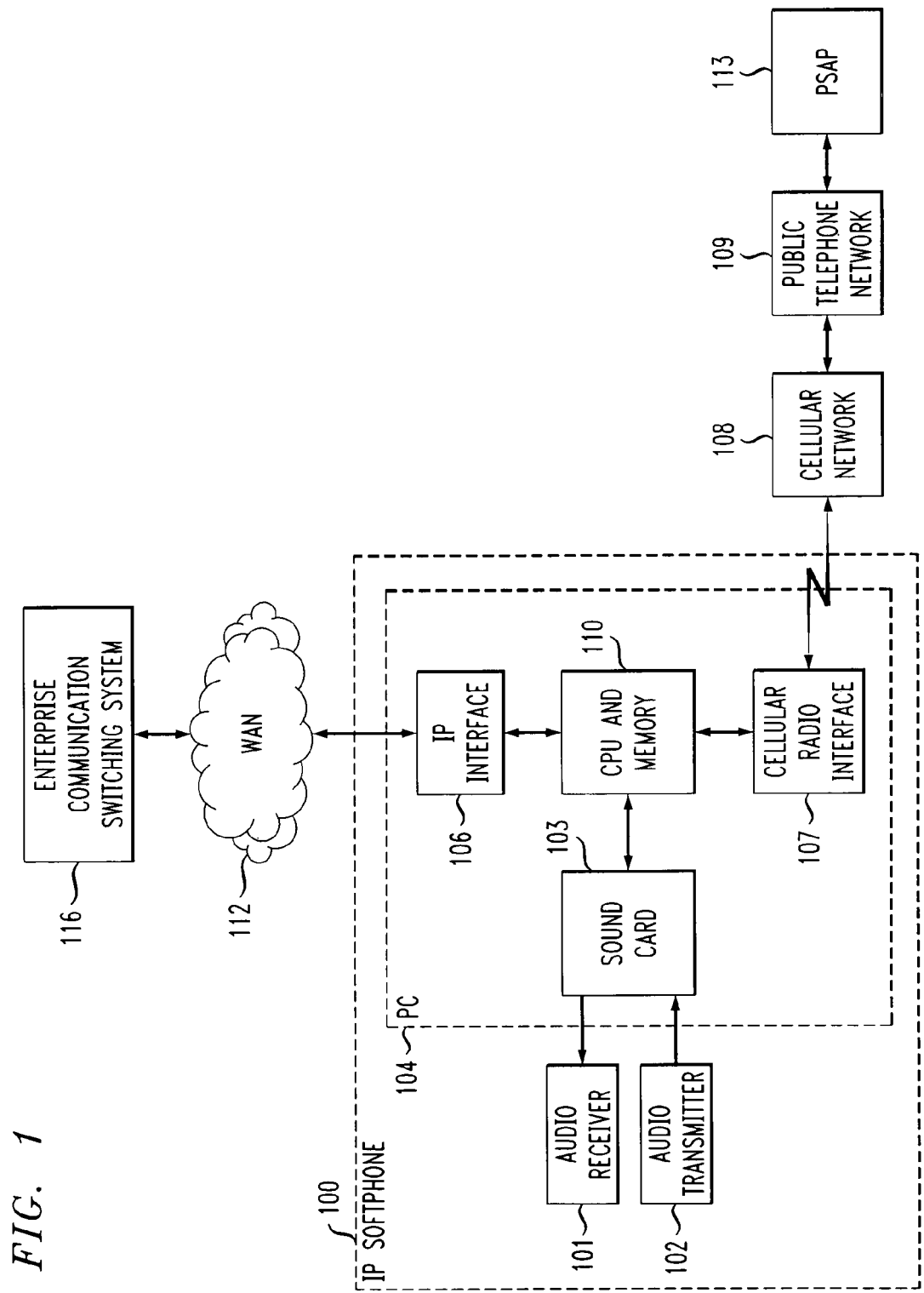
FIG. 1 illustrates, in block diagram form, an embodiment of an IP softphone utilizing the present invention.

FIG. 1 illustrates an embodiment of a system for implementing the invention. IP softphone 100 is registered as a telephone with enterprise communication switching system 116 via wide area network (WAN) 112. WAN 112 may advantageously be a local area network (LAN) or, as is well known in the art, the Internet, ATM network, etc. One skilled in the art could readily envision that IP softphone 100 was not registered with enterprise communication switching system 116 but rather is simply a telephone device utilizing WAN 112 for communication with other softphones such as softphone 111. Enterprise communication switching system 116 may advantageously be an Avaya Definity® business communication switching system (commonly referred as PBX). Advantageously, as is well known in the art, enterprise communication switching system 116 can be any other type of system such as an H.323 calling system. Cellular network 108 is a well-known commercially available cellular switching system. PSAP 113 is a well-known public safety answering point. Public telephone network 109 is a switching public telephone network.

IP softphone 100 comprises personal computer (PC) 104 that provides overall control for the softphone. The audio interface is provided by elements 101–103. IP interface 106 provides interconnection to WAN 112. Radio interface 107 is intragral part of PC 104 and provides the cellular radio interface for placing telephone calls via cellular network 108. Radio interface 107 is the radio circuitry found in any commercial cellular telephone and is well known by those skilled in the art.

For normal telephone calls, IP softphone 100 communicates via WAN 112 with enterprise communication switching system 116. IP softphone 100 appears to be another telephone set to enterprise communication switching system 116 from the point of view of call processing. If the user of IP softphone 100 originates a normal call, this telephone call is placed via WAN 112 to enterprise communication switching system 116. However, if the user of IP softphone 100 places an emergency call by dialing advantageously "911", PC 104 originates this call via radio interface 107 through cellular network 108. Cellular network 108 in combination with public telephone network 109 sets up the emergency call to PSAP 113. In addition, cellular network 108 provides the physical location of IP softphone 100 to PSAP 113.

Figure 2:
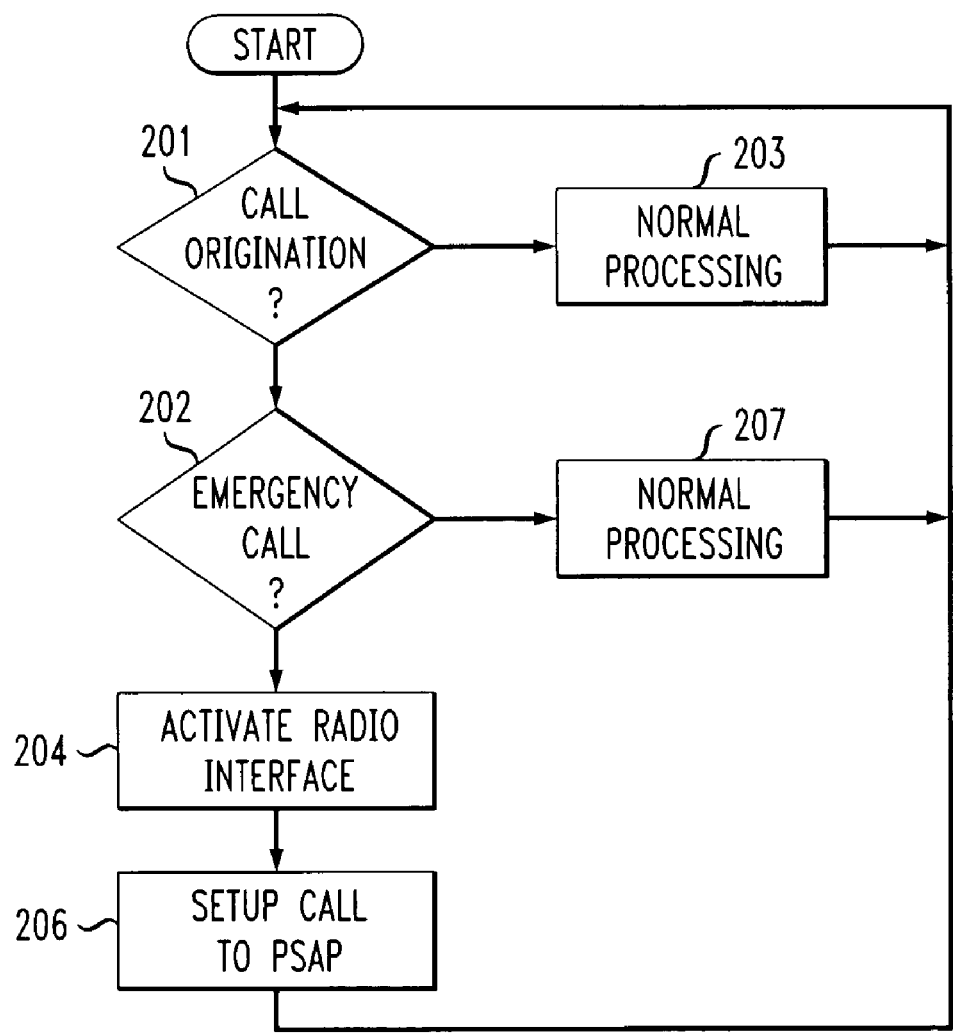
FIG. 2 illustrates, in flow chart form, the steps performed by the IP softphone in implementing an embodiment of the invention.

FIG. 2 illustrates, in flow chart form, the steps performed by PC 104 in implementing the invention. After being started, decision block 201 determines if the operation being performed in call processing is a call origination. If the answer is no, the call processing operation is processed in a normal manner by block 203 before transferring control back to decision block 201. If the answer in decision block 201 is that the call processing operation is a call origination, decision block 202 determines if it is an emergency call to a PSAP. If the answer is no, block 207 performs normal processing before transferring control back to decision block 201. If the answer in decision block 202 is yes, block 204 activates radio interface 107, and block 206 places a call to the PSAP via cellular network 108 and public telephone network 109 before returning control back to decision block 201.

Figure 3:
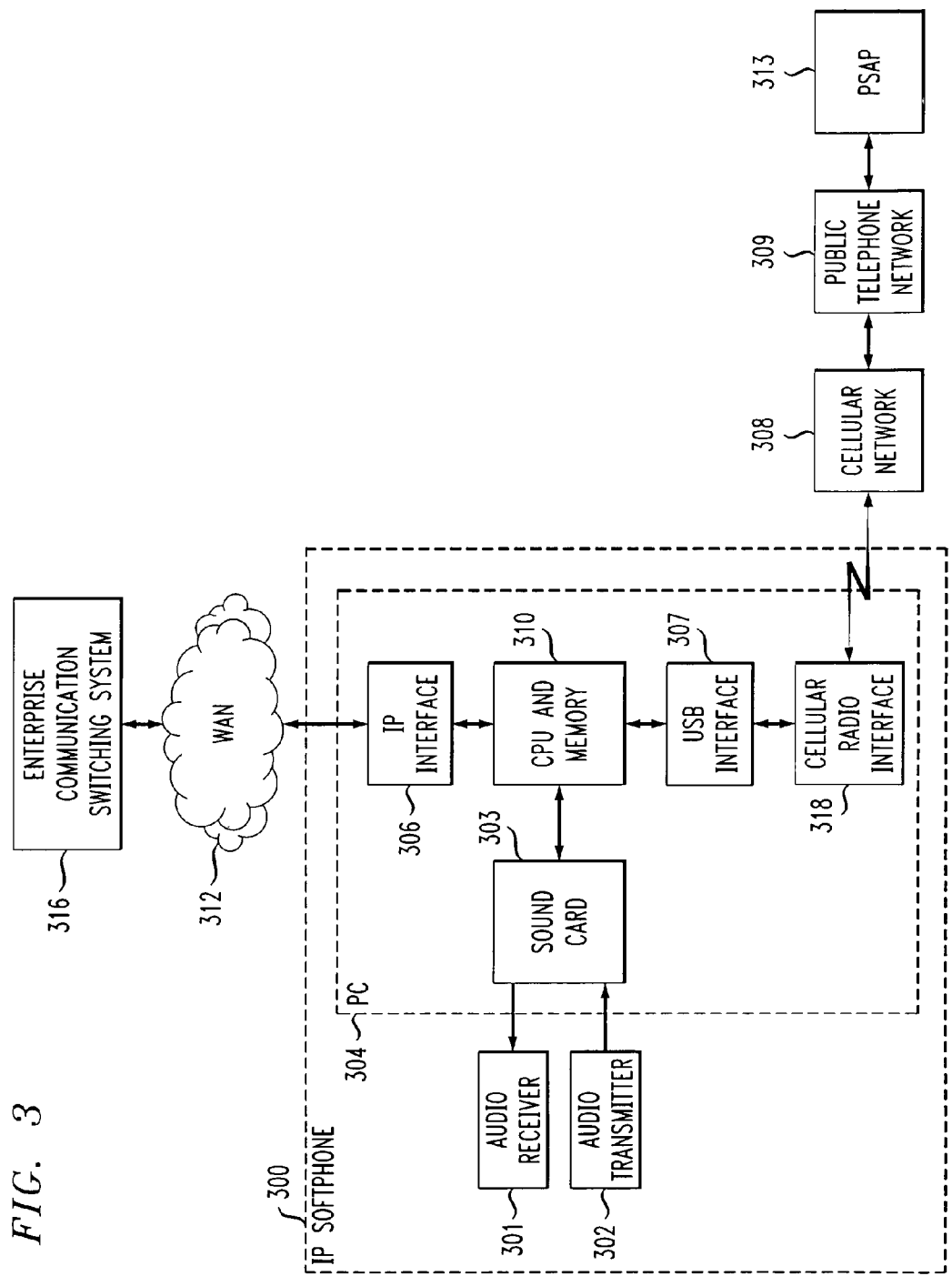
FIG. 3 illustrates, in block diagram form, another embodiment of an IP softphone utilizing the present invention.

FIG. 3 illustrates another embodiment of a system for implementing the invention. IP softphone 300 is registered as a telephone with enterprise communication switching system 316 via wide area network (WAN) 312. WAN 312 may advantageously be a local area network (LAN) or, as is well known in the art, the Internet, ATM network, etc. One skilled in the art could readily envision that IP softphone 300 was not registered with enterprise communication switching system 316 but rather is simply a telephone device utilizing WAN 312 for communication with other softphones such as softphone 311. Enterprise communication switching system 316 may advantageously be an Avaya Definity® business communication switching system (commonly referred as PBX). Advantageously, as is well known in the art, enterprise communication switching system 316 can be any other type of system such as an H.323 calling system. Cellular network 308 is a well-known commercially available cellular switching system. PSAP 313 is a well-known public safety answering point. Public telephone network 309 is a switching public telephone network.

IP softphone 300 comprises personal computer (PC) 304 that provides overall control for the softphone. The audio interface is provided by elements 301–303. IP interface 306 provides interconnection to WAN 312. Universal Serial Bus interface (USB) 307 connects cellular radio circuit 318 to PC 304. USB 307 is well known by those skilled in the art. Cellular radio circuit 318 is external to PC 304 and is used by PC 304 for placing telephone calls via cellular network 308. Cellular radio circuit 318 is the radio circuitry found in any commercial cellular telephone and is well known by those skilled in the art.

For normal telephone calls, IP softphone 300 communicates via WAN 312 with enterprise communication switching system 316. IP softphone 300 appears to be another telephone set to enterprise communication switching system 316 from the point of view of call processing. If the user of IP softphone 300 originates a normal call, this telephone call is placed via WAN 312 to enterprise communication switching system 316. However, if the user of IP softphone 300 places an emergency call by dialing advantageously "911", PC 304 originates this call via USB 307 and cellular radio circuit 318 through cellular network 308. Cellular network 308 in combination with public telephone network 309 sets up the emergency call to PSAP 313. In addition, cellular network 308 provides the physical location of IP softphone 300 to PSAP 313. PC 304 performs similar steps to those illustrated in FIG. 2.

Of course, various changes and modifications to the illustrated embodiment described above will be apparent to those skilled in the art. Such changes and modifications can be made without departing from the spirit and scope of the invention and without diminishing its intended advantages. It is therefore intended that such changes and modifications be covered by the following claims except insofar as limited by the prior art.

What is claimed is:

1. A method for routing emergency telephone calls via an IP softphone to a public safety answering point, comprising the steps of:
communicating non-emergency telephone calls via a wide area network by the IP softphone;
detecting an emergency telephone call being originated by the IP softphone;
originating always a direct communication path for the emergency telephone call via an cellular radio interface and a cellular network to the public safety answering point whereby the emergency telephone calls are always communicated via the cellular radio interface and the cellular network to the public safety answering point;
communicating the emergency telephone call via the communication path via the cellular network to the public safety answering point whereby the public safety answering point responds to the emergency telephone call and determines a location of the IP Softphone;
detecting a termination of the emergency telephone call by the IP softphone; and
re-communicating non-emergency telephone calls via the wide area network by the IP Softphone whereby non-emergency telephone calls are always communicated via the wide area network.

2. The method of claim 1 wherein the cellular radio interface is an integral part of the IP softphone.

3. The method of claim 1 wherein the cellular radio interface is external to the IP softphone.

4. The method of claim 3 further comprises connecting the cellular radio interface to the IP softphone via an universal serial bus interface.

5. A method for routing emergency telephone calls via an IP softphone to a public safety answering point, comprising the steps of:
communicating always non-emergency telephone calls via a wide area network to an enterprise communication switching system by the IP softphone;
detecting an emergency telephone call being originated by the IP Softphone;
originating always a direct communication path for the emergency telephone call via an cellular radio interface and a cellular network to the public safety answering point whereby the emergency telephone calls are always communicated via the cellular radio interface and the cellular network to the public safety answering point;
communicating the emergency telephone call via the communication path via the cellular network to the public safety answering point whereby the public safety answering point responds to the emergency telephone call and determines a location of the IP Softphone;
detecting a termination of the emergency telephone call by the IP softphone; and
re-communicating non-emergency telephone calls via the wide area network to the enterprise communication switching system by the IP Softphone whereby non-emergency telephone calls are always communicated via the wide area network.

6. The method of claim 5 wherein the cellular radio interface is an integral part of the IP softphone.

7. The method of claim 6 wherein the cellular radio interface is external to the IP softphone.

8. The method of claim 7 further comprises connecting the cellular radio interface to the IP softphone via an universal serial bus interface.

9. An IP softphone for routing emergency telephone calls to a public safety answering point, comprising:
a first interface communicating non-emergency telephone calls via a wide area network;
a personal computer for detecting an emergency telephone call being originated by the IP softphone;
the personal computer further always originating a direct communication path for the emergency telephone call via a second interface and a cellular network to the public safety answering point whereby the emergency telephone calls are always communicated via the cellular radio interface and the cellular network to the public safety answering point;

the second interface under control of the personal computer communicating the emergency telephone call via the communication path via the cellular network to the public safety answering point whereby the public safety answering point responds to the emergency telephone call and determines a location of the IP Softphone;

the second interface detecting under control of the personal computer a termination of the emergency telephone call; and the first interface re-communicating non-emergency telephone calls under control of the personal computer via the wide area network whereby non-emergency telephone calls are always communicated via the wide area network.

10. The IP softphone of claim 9 wherein the second interface is an integral part of the personal computer.

11. The IP softphone of claim 9 wherein the second interface is external to the personal computer.

12. The IP softphone of claim 11 wherein the first interface is an universal serial bus interface.

13. An IP softphone for routing emergency telephone calls to a public safety answering point, comprising:

a first interface communicating non-emergency telephone calls via a wide area network to an enterprise communication switching system;

a personal computer for detecting an emergency telephone call being originated by the IP softphone;

the personal computer further always originating a direct a communication path for the emergency telephone call via a second interface and a cellular network to the public safety answering point whereby the emergency telephone calls are always communicated via the cellular radio interface and the cellular network to the public safety answering point;

the second interface under control of the personal computer communicating the emergency telephone call via the communication path via the cellular network to the public safety answering point whereby the public safety answering point responds to the emergency telephone call and determines a location of the IP Softphone;

the second interface detecting under control of the personal computer a termination of the emergency telephone call; and the first interface re-communicating non-emergency telephone calls under control of the personal computer via the wide area network whereby non-emergency telephone calls are always communicated via the wide area network.

14. The IP softphone of claim 13 wherein the second interface is an integral part of the personal computer.

15. The IP softphone of claim 13 wherein the second interface is external to the personal computer.

16. The IP softphone of claim 15 wherein the first interface is an universal serial bus interface.

* * * * *